(12) United States Patent
Masuda et al.

(10) Patent No.: US 6,340,999 B1
(45) Date of Patent: Jan. 22, 2002

(54) FRONT LIGHT, AND REFLECTIVE TYPE LCD INCLUDING SAME

(75) Inventors: Takeshi Masuda, Kyoto; Yukihiro Sumida; Tsuyoshi Ebi, both of Nara-ken, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/393,298

(22) Filed: Sep. 10, 1999

(30) Foreign Application Priority Data

Sep. 14, 1998 (JP) .......................................... 10-260673
Nov. 11, 1998 (JP) .......................................... 10-321072

(51) Int. Cl.⁷ .......................................... G02F 1/1335
(52) U.S. Cl. .......................... 349/63; 349/61; 349/117; 349/137
(58) Field of Search ............................ 349/63, 61, 137, 349/117, 10; 359/234, 15, 487; 430/7

(56) References Cited

U.S. PATENT DOCUMENTS

| | | | | |
|---|---|---|---|---|
| 6,005,651 A | * | 12/1999 | Takahara et al. | 349/137 |
| 6,011,640 A | * | 1/2000 | Hutton | 359/234 |
| 6,049,364 A | * | 4/2000 | Takahara et al. | 349/10 |
| 6,057,067 A | * | 5/2000 | Isberg et al. | 430/7 |
| 6,081,354 A | * | 6/2000 | Gambogi | 359/15 |
| 6,091,184 A | * | 7/2000 | De Vries | 313/110 |
| 6,108,059 A | * | 8/2000 | Yang | 349/117 |
| 6,124,971 A | * | 9/2000 | Ouderkirk et al. | 359/487 |

FOREIGN PATENT DOCUMENTS

JP           63-4515         1/1988

OTHER PUBLICATIONS

SID '95 Digest, p. 375–378.
FPD Intelligence, 9/98, p. 22–23.

* cited by examiner

Primary Examiner—William L. Sikes
Assistant Examiner—Julie Ngo
(74) Attorney, Agent, or Firm—Nixon & Vanderhye P.C.

(57) ABSTRACT

A front light includes a light source, a light guide for receiving light from the light source through an end surface of the light guide and outputting the light through a first large surface which is substantially perpendicular to the end surface, and a polarization selecting section for selectively transmitting light having particular polarization, the polarization selecting section being attached to the first large surface of the light guide such that any reflection does not occur at an interface between the polarization selecting section and the light guide.

4 Claims, 16 Drawing Sheets

Measuring points

System of measurement

Delta arrangement

Stripe arrangement

FRONT LIGHT, AND REFLECTIVE TYPE LCD INCLUDING SAME

BACKGROUND OF THE INVENTION

1. Field of the Invention

The present invention relates to a reflective type liquid crystal display apparatus used in information display systems, office automation equipment, or the like, and to a front light for illuminating the same without deteriorating the display quality thereof.

2. Description of the Related Art

Typically, a reflective type liquid crystal display apparatus includes a reflective type liquid crystal display device (a liquid crystal panel) having a pair of glass substrates and a liquid crystal layer interposed therebetween. One of the glass substrates on the rear side of the reflective type liquid crystal display device is provided with a reflector. The other substrate on the light introduction side of the reflective type liquid crystal display device is provided with a polarization selecting section including a polarization plate, a quarter-wave plate, etc. While incident light transmitted through the polarization selecting section is reflected by the reflector, the polarization of the incident light is modulated by the liquid crystal layer. Thus, the amount of light which is output from the reflective type liquid crystal display device through the polarization selecting section is controlled, thereby displaying images.

Hereinafter, typical transitions of the polarization of light passing through this reflective type liquid crystal display apparatus will be described with reference to FIG. 14.

The reflective type liquid crystal display apparatus has a reflective type liquid crystal display device 65, in which a liquid crystal layer 66 is interposed between a pair of glass substrates 65a and 65b, and a reflector 67 is provided between the rear-side glass substrate 65b and the liquid crystal layer 66. On the front side of the reflective type liquid crystal display device 65, a polarizing plate 64a and a quarter-wave plate 64b are provided such that a transmission axis (or an absorption axis) of the polarizing plate 64a makes an angle of about 45° with a slow axis (or a fast axis) of the quarter-wave plate 64b.

A portion of incident light (linearly polarized light) transmitted through the polarizing plate 64a is converted to circularly polarized light by the quarter-wave plate 64b and incident upon the reflective type liquid crystal display device 65. When the liquid crystal layer 66 of the reflective type liquid crystal display device 65 does not modulate the incident circularly polarized light, the rotary direction of the circularly polarized light is inverted as the light is reflected by the reflector 67. Then, the light is again transmitted through the quarter-wave plate 64b (upwardly in FIG. 14) and is converted to linearly polarized light having a polarization direction A at about 90° with the transmission axis of the polarizing plate 64a. Thus, the light is absorbed by the polarizing plate 64a, resulting in a black display.

On the other hand, when the liquid crystal layer 66 modulates the incident circularly polarized light, the light may be reflected by the reflector 67 and exit the reflective type liquid crystal display device 65 with the original circular polarization. Then, the light, after passing through the quarter-wave plate 64b again, becomes linearly polarized light whose direction of polarization B is identical with the direction of the transmission axis of the polarizing plate 64a so as to be transmitted through the polarizing plate 64a, resulting in a white display.

The directions of the transmission axis of the polarizing plate 64a and the slow axis of the quarter-wave plate 64b are determined in view of the liquid crystal material, the orientation of the liquid crystal material, the viewing angle characteristic, etc. Furthermore, in order to compensate for the tolerance of the phase delay with respect to the wavelength of the light output from the quarter-wave plate 64b, a half-wave plate may be provided between the polarizing plate 64a, and the quarter-wave plate 64b. The polarizing plate, the half-wave plate, and the quarter-wave plate are usually integrated together via adhesive layers, and further attached to the reflective type liquid crystal display device via another adhesive layer.

Furthermore, when images are displayed in colors by this reflective type liquid crystal display apparatus, light is transmitted through a color filter layer including color filter portions of three primary colors, i.e., red, green, and blue, which are provided in each pixel, whereby colored light can be obtained. Among various RGB arrangements, a delta arrangement as shown in FIG. 15A and a stripe arrangement as shown in FIG. 15B are commonly used. In these color filter arrangements, a unit pattern (corresponding to one pixel) comprising the three primary color portions is repeated in the vertical and horizontal direction.

Also, the number of pixels provided and the size of each pixel vary for different specifications. For example, for a 2.0" reflective type liquid crystal display apparatus employing a delta arrangement, the number of pixels is 280×220 (horizontal×vertical), the pixel size is 145.5 μm in the horizontal direction and 138.5 μm in the vertical direction. For a 2.5" display, the number of pixels is 280×220 (horizontal×vertical), and the pixel size is 179.5 μm in the horizontal direction and 168.5 μm in the vertical direction. For a 3.8" QVGA reflective type liquid crystal display apparatus, pixels are patterned in a stripe arrangement, the number of pixels is 960×240 (horizontal pixels×vertical pixels), and the pixel size is 81 μm in the horizontal direction and 234.5 μm in the vertical direction.

A reflective type liquid crystal display apparatus can display images using ambient light. However, since the brightness of the display is significantly dependent on the environment in which the apparatus is used, the displayed images may not be perceived at all, especially in the dark, e.g., at night.

Thus, for cases where sufficient ambient light cannot be obtained, a type of illuminator, called a "front light", for illuminating a reflective type liquid crystal display device from the front side thereof, has been proposed in the art.

For example, in SID '95 DIGEST, p.375, a front light as shown at reference numeral 81 in FIG. 16 is disclosed.

The front light 81 includes a light guide 83 and a light source 82 placed on an end surface of the light guide 83. An upper surface 83c opposite to a lower surface 83b of the light guide 83 includes periodic concave and convex portions. Light is output from the light source 82 and propagates through the light guide 83. The light may be reflected by the upper surface 83a one time so as to exit the light guide 83 or may be totally reflected by the lower surface 83b and/or the upper surface 83c several times while propagating through the light guide 83, so as to be reflected by the periodic concave-convex portions light guide 83 thereby exiting the lower surface 83b. Thereafter, the light output from the lower surface 83b is incident on a reflective type liquid crystal display device 85, to which the polarization selecting section 84 including a polarizing plate and a quarter-wave plate is attached via an adhesive layer 90.

However, when the above-described front light 81 is ON, some of the output light leaks through the upper surface 83c of the light guide 83 to directly reach the viewer's eye, whereby the black display is degraded because of the light leakage. This significantly deteriorates the contrast of the display. Furthermore, the light leaking through the upper surface 83c may be incident on a foreign material such as dust in the vicinity of the upper surface 83c or a flaw on the surface of the light guide 83, which is then observed as a bright spot. In addition, the leak light may also be incident on a foreign material present between the front light 81 and the polarization selecting section 84, which is observed as a bright spot. These bright spots may deteriorate the production yield as well as the display quality of the device, and therefore are causes of serious problems.

Furthermore, the front light employing the above-described periodic concave/convex portions may generate two types of brightness fringe as follows.

The first type of brightness fringe will be described.

Light from the light source 82 is incident on the light guide 83 through the end surface 83a and propagates through the light guide 83. The light is then reflected by the periodic concave/convex portions of the upper surface 83c toward the lower surface 83b. A large portion of the light exits the lower surface 83b so as to irradiate the reflective type liquid crystal display device 85. However, about 4% of the light is reflected by the lower surface 83b and passes through the periodic concave/convex portions of the upper surface 83c so as to reach the viewer's eye. Thus, since the viewer observes the light through the periodic concave/convex portions, the first brightness fringe is observed. Furthermore, for the same reason, the first brightness fringe is observed by the surface reflection of the polarization selecting section 84, thereby significantly deteriorating the display quality.

Next, the second type of brightness fringe will be described.

As described above, the light from the light source 82 is reflected by the periodic concave/convex portions of the upper surface 83c and exits the light guide 83 so as to be incident on the reflective type liquid crystal display device 85. The incident illumination light is reflected by each pixel of the reflective type liquid crystal display device 85. The reflected light is passed through the periodic concave/convex portions of the light guide 83 again so as to reach the viewer's eye, whereby an image may be perceived by the viewer. Therefore, the second brightness fringe is observed as a result of the interference of light reflected by the periodic concave/convex portions of the light guide 83, light reflected by the pixel pattern of the reflective type liquid crystal display device 85, and light transmitted through the periodic concave/convex portions of the light guide 83. Likewise, in the case where images are observed with ambient light, light passes through the periodic concave/convex portions of the light guide 83, the pixel pattern of the reflective type liquid crystal display device 85, and the periodic concave/convex portions of the light guide 83 again, thereby generating the second brightness fringe due to interference.

Japanese Laid-Open Utility Model Publication No. 63-4515 discloses a method for preventing the reflection at the interface between the light guide and the liquid crystal panel. In this method, a liquid crystal cell 31 and a light guide 35 are closely attached together via a transparent resin 36, as shown in FIG. 17. However, this utility model publication does not disclose components such as a polarizing plate, and a phase plate. Thus, it does not disclose any of the effects provided by the present invention in which the polarization selecting section is attached to the light guide of the front light.

Furthermore, when the liquid crystal cell 31 and the light guide 35 are closely attached together as shown in FIG. 17, since they are both rigid, bubbles may be introduced therebetween, an adhesive resin may not be sufficiently cured, or a re-work may not be done. Thus, the production of the device may become difficult.

SUMMARY OF THE INVENTION

According to one aspect of the present invention, a front light includes a light source, a light guide for receiving light from the light source through an end surface of the light guide and outputting the light through a first large surface which is substantially perpendicular to the end surface, and a polarization selecting section for selectively transmitting light having particular polarization, the polarization selecting section being attached to the first large surface of the light guide such that any reflection does not occur at an interface between the polarization selecting section and the light guide.

In one embodiment of the present invention, the polarization selecting section is attached to the light guide via a refraction layer having a refractive index approximate to refractive indices of the light guide and the polarization selecting section.

In another embodiment of the present invention, the refractive index of the refraction layer is slightly different from the refractive index of the light guide.

In still another embodiment of the present invention, the refractive index of the refraction layer is smaller than the refractive index of the light guide.

In still another embodiment of the present invention, a difference between the refractive index of the refraction layer and the refractive index of the light guide is more than 0 and is 0.2 or less.

In still another embodiment of the present invention, a second large surface opposite to the first large surface of the light guide includes periodic concave/convex portions formed at a predetermined pitch, each of the periodic concave/convex portions including a propagation portion for propagating light from the light source and a reflection portion for reflecting the propagating light toward the first large surface.

In still another embodiment of the present invention, the polarization selecting section is a combination of a polarizing plate and a quarter-wave plate.

In still another embodiment of the present invention, the polarization selecting section is a combination of a polarizing plate, a half-wave plate, and a quarter-wave plate.

According to one aspect of the present invention, a reflective type liquid crystal display apparatus includes a front light according to claim 1, and a reflective type liquid crystal display device including a plurality of pixels for receiving light from the first large surface of the light guide through the polarization selecting section, controlling polarization of the received light for each of the pixels, and reflecting the polarized light toward the polarization selecting section.

In one embodiment of the present invention, a surface of the polarization selecting section facing the reflective type liquid crystal display device is subjected to an anti-reflection treatment.

In another embodiment of the present invention, a surface of the reflective type liquid crystal display device facing the polarization selecting section is subjected to an anti-reflection treatment.

In still another embodiment of the present invention, the reflective type liquid crystal display device and the polarization selecting section are not in contact with each other.

In still another embodiment of the present invention, the periodic concave/convex portions are formed such that a direction of a stripe thereof is not identical with a horizontal direction of a repetitive pixel pattern of the reflective type liquid crystal display device.

In still another embodiment of the present invention, the periodic concave/convex portions are formed such that the direction of the stripe thereof makes an angle of about 10° to about 80° with the horizontal direction of the repetitive pixel pattern.

In still another embodiment of the present invention, the pixel pattern of the reflective type liquid crystal display device is a delta arrangement, and the periodic concave/convex portions are formed such that the direction of the stripe thereof makes an angle of about 10° to about 25° or an angle of about 55° to about 80° with the horizontal direction of the repetitive pixel pattern.

In still another embodiment of the present invention, the pixel pattern of the reflective type liquid crystal display device is a stripe arrangement, and the periodic concave/convex portions are formed such that the direction of the stripe thereof makes an angle of about 15° to about 75° with the horizontal direction of the repetitive pixel pattern.

Hereinafter, functions of the present invention will be described.

According to the present invention, a polarization selecting section is optically attached to the light guide such that the reflection does not occur at the interface therebetween. A light incident on an end surface of the light guide propagates through the light guide. During its propagation, the light reaches a second large surface of the light guide, i.e., the light reaches one of periodic concave/convex portions of an upper surface which is opposite to a first large surface (a lower surface) of the light guide, and the light is reflected by one of periodic concave/convex portions toward the first large surface. Only light having particular polarization is selectively transmitted through a polarization selecting section so as to irradiate the reflective type liquid crystal display device. The reflective type liquid crystal display device controls the polarization of the irradiated light for each pixel by the liquid crystal layer and reflects the irradiated light toward the reflective type liquid crystal display device. Thereby, images are displayed while controlling the amount of light transmitted through the polarization selecting section.

The light propagating through the front light is transmitted through the polarization selecting section repeatedly during its propagation, so that light other than the light having particular polarization is absorbed by the polarizing plate. Therefore, in the front light of the present invention, as compared with the conventional front light in which light propagating through the light guide is not polarized in any direction, the amount of light is reduced by ½ or more, whereby the amount of light which leaks from the upper surface of the light guide toward a viewer is reduced to ½ or less. Thus, the deterioration of the display contrast can be suppressed. Furthermore, for the same reasons, bright spots resulting from foreign materials, on which leak light is incident and scattered, can be reduced, thereby improving the display quality and the production yield.

Furthermore, according to the present invention, light is transmitted through the polarization selecting section attached to the light guide before it exits the front light so as to be converted to light having particular polarization which is necessary for the display of the reflective type liquid crystal display device. On the other hand, in the conventional front light, light output from the front light is transmitted through the polarization selecting section attached to the reflective type liquid crystal display device such that only light having particular polarization which is necessary for the display is transmitted through the polarization selecting section. Therefore, in the front light of the present invention, the amount of light is ½ or less than that of the conventional front light while the amount of the polarized light incident on the reflective type liquid crystal display device is equal to that in the conventional front light. As a result, bright spots resulting from foreign materials, on which the light from the front light is incident and scattered, can be reduced, thereby improving the display quality and the production yield.

According to the present invention, the polarization selecting section is attached to the light guide through a refraction layer whose refractive index is close to both of the refractive indices of the light guide and the polarization selecting section. Thereby, the light guide and the polarization selecting section can be optically integrated together such that any reflection does not occur at the interface therebetween.

However, in the front light, it is required that light introduced from the light source and incident on an end surface of the light guide propagate through the light guide by utilizing the reflections on the first and second large surfaces. Therefore, when a refractive index of the light guide is completely equal to that of the refraction layer so that no reflection occurs on the first large surface, propagation of the light is hindered, whereby the intensity of the light decreases as it goes away from the light source. Thus, it is preferable that a refractive index of the refraction layer provided between the light guide and the polarization selecting section be slightly different from that of the light guide. In Embodiment 3 which will be described later, as shown in FIG. 11, by providing a refractive layer having a refractive index slightly different from that of the light guide, light which is incident upon the interface at a large angle is reflected by the interface, whereby the amount of light propagating through the light guide increases. Thus, such reflection at the interface effectively promotes the propagation of the light through the light guide, thereby suppressing the decrease of the intensity of the illumination light so as to obtain uniform illumination light. Furthermore, since light which is incident upon the interface at a large angle is reflected by the interface, and is not reflected toward the viewer, the display quality does not deteriorate.

Specifically, it is preferable that the refractive index of the refraction layer be regulated so as to be smaller than that of the light guide because a total reflection (where the reflectivity is 1) occurs in this condition, whereby the light effectively propagates through the light guide.

Furthermore, in Embodiment 3 which will be described later, as shown in FIG. 12, it is preferable that the difference in the refractive index between the light guide and the refractive layer be in the range from about 0 to about 0.2, because the surface reflection increases as the difference increases. When the difference in the refractive index between the light guide and the refractive layer is about 0.2 or less, a reflectivity at the interface therebetween is about 0.5% or less. Therefore, the reflectivity at the interface between the light guide and the reflection layer, and the reflectivity of the interface between the refraction layer and the polarization selecting section can be reduced to about 1% or less.

When the polarization selecting section is attached to the light guide via a refraction layer whose refractive index is close to both of refractive indices of the light guide and the polarization selecting section, the polarization selecting section can be attached to the light guide via an adhesive layer having a refractive index of, for example, about 1.5. Furthermore, by regulating the refractive index of the adhesive layer so as to be slightly different from that of the light guide as described above, uniform illumination can be obtained. Alternatively, the polarization selecting section may be attached to the light guide through a transparent film having a refractive index approximate to both that of the light guide and that of the polarization selecting section, for example, about 1.5. The polarization selecting section may alternatively be attached to the light guide via a transparent resin. Also in these cases, by regulating the refractive index of the transparent film or the transparent resin so as to be slightly different from that of the light guide, uniform illumination can be obtained.

In the conventional structure, the upper surface of the light guide may include periodic concave/convex portions which are formed at a predetermined pitch, wherein each of the periodic concave/convex portions includes a propagation portion through which light from the light source propagates, and a reflection portion which reflects the incident light toward a lower surface. In such a structure, light reflected by the lower surface of the light guide or the surface of the polarization selecting section reaches the viewer's eye through the periodic concave/convex portions, whereby the above-described first brightness fringe is observed. In the present invention, on the other hand, the polarization selecting section is attached to the lower surface of the light guide. Therefore, the reflection at the interface between the light guide and the polarization selecting section can be reduced to improve the display quality. Furthermore, when the polarization selecting section is attached to the light guide via a refraction layer having a refractive index slightly different from that of the light guide, the surface reflection is small because the refractive index difference therebetween is very small. As described above, by regulating the difference in refractive index between the light guide and the polarization selecting section so as to be about 0.2 or less, the surface reflection is reduced to about 1% or less, thereby preventing the first brightness fringe from being observed.

As described above, in the front light where the upper surface of the light guide includes periodic concave and convex portions, light passes through the periodic concave/convex portions of the light guide, a pixel pattern of the reflective type liquid crystal display device, and again the periodic concave/convex portions of the light guide before it reaches the viewer's eye, whereby the second brightness fringe may be observed. In the present invention, in order to prevent the second brightness fringe from being observed, the periodic concave/convex portions are designed so that the direction of the stripe of periodic concave/convex portions is not identical with the direction of a repetitive pixel pattern. In such a structure, a pitch of the second brightness fringe is shortened so that it is not perceived by the viewer, whereby the display quality can be improved.

When the pixels are patterned in a delta arrangement, it is preferable that the stripes of the periodic concave/convex portions be designed so as to make an angle in the range from about 10° to about 25° or from about 55° to about 80° with the horizontal direction of the repetitive pixel pattern. In this structure, the second brightness fringe is not observed, as will be later described in Embodiment 1 with reference to FIG. 7.

When the pixels are patterned in a stripe arrangement, it is preferable that the stripes of the periodic concave/convex portions be designed so as to make an angle in the range from 15° to 75° with the horizontal direction of the repetitive pixel pattern. In this structure, the second brightness fringe is not observed, as will be later described in Embodiment 1 with reference to FIG. 8.

The polarization selecting section may be a plate including a polarizing plate and a quarter-wave plate optically attached to each other can be used. When the polarization selecting section is designed such that an angle between the transmission axis (or the absorption axis) of the polarizing plate and the slow axis (or the fast axis) of the quarter-wave plate is about 45°, only circularly polarized light which has passed through polarizing plate and the quarter-wave plate is output from the front light as illumination light. While the circularly polarized light is incident on the reflective type liquid crystal display device and reflected by the reflector thereof, the polarization of the light is modulated so that the amount of light which is transmitted through the polarizing plate is controlled.

Alternatively, the polarization selecting section may be a plate further including a half-wave plate optically attached between a polarizing plate and a quarter-wave plate. In this structure, the half-wave plate can compensate for the tolerance of the phase delay with respect to the light output from the quarter-wave plate, whereby circularly polarized light, which is suitable for the reflective type liquid crystal display device, can be obtained over a wide wavelength range.

By employing such structures for the polarization selecting section, a portion of circularly polarized light which has passed through the polarization selecting section, i.e., light reflected by a surface of the front light facing the reflective liquid crystal display device (i.e., an interface between the quarter-wave plate and air) and light reflected by the surface of the reflective liquid crystal display device are converted to linearly polarized light crossing the transmission axis of the polarizing plate with an angle of 90° when the reflected light are transmitted through the quarter-wave plate again, so as to be absorbed by the polarizing plate. Therefore, the brightness fringe of the light guide can be prevented from being perceived, and the deterioration of the contrast ratio of the display due to the surface reflection can be prevented.

In the reflective liquid crystal display apparatus of the present invention, about 4% surface reflection is generated on the interface between the front light and the reflective liquid crystal display device, i.e., on the surface of the polarization selecting section, and on the surface of the reflective liquid crystal display device. Light beams resulting from this surface reflection are absorbed by the polarizing plate of the polarization selecting section. Thus, this surface reflection does not affect the contrast ratio of the display. However, due to this surface reflection, the amount of light incident on the reflective liquid crystal display device and used for the display, and the amount of light reflected by the reflective liquid crystal display device to reach the viewer's eye decrease, thereby deteriorating the brightness of the display. Therefore, it is preferable that a surface of the polarization selecting section facing the reflective liquid crystal display device, or a surface of the reflective liquid crystal display device facing the polarization selecting section, or both of these surfaces be subjected to the anti-reflection treatment.

In the present invention, since it is undesirable that the reflective liquid crystal display device and the front light are in close contact with each other, the reflective liquid crystal display device is not attached to the front light. That is, when the reflective type liquid crystal display device (a liquid crystal cell) and the light guide are closely attached to each other as in the conventional display apparatus, since they are both rigid, bubbles maybe introduced therebetween, an adhesive resin may not be sufficiently cured, or a re-work may not be done, whereby the production of the device becomes difficult. On the other hand, in the present invention, an air layer is present between the reflective liquid crystal display device and the front light. However, light reflected by the interfaces thereof is absorbed by the polarization selecting section, as described above, and therefore does not affect the contrast ratio of the display. Furthermore, the reflection of light can be prevented by the anti-reflection treatment described above.

Thus, the invention described herein makes possible the advantages of providing (1) a front light which can effectively output light without deteriorating the display quality and (2) a reflective type liquid crystal display apparatus with high brightness and high production yield.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the drawings.

(Embodiment 1)

Figure 1:
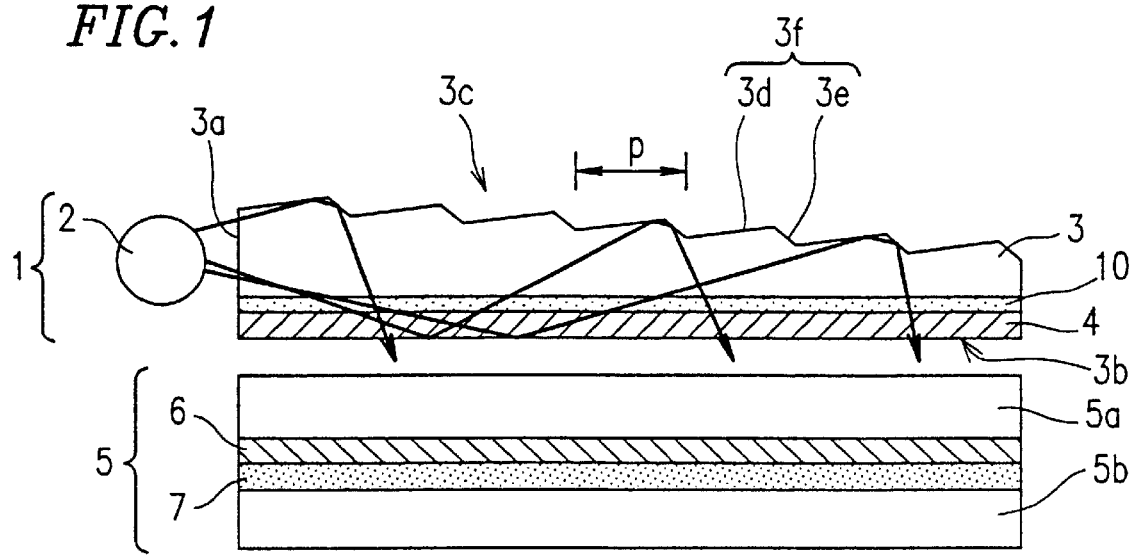
FIG. 1 is a cross-sectional view showing a structure of a reflective type liquid crystal display apparatus according to Embodiment 1.
Figure 2:
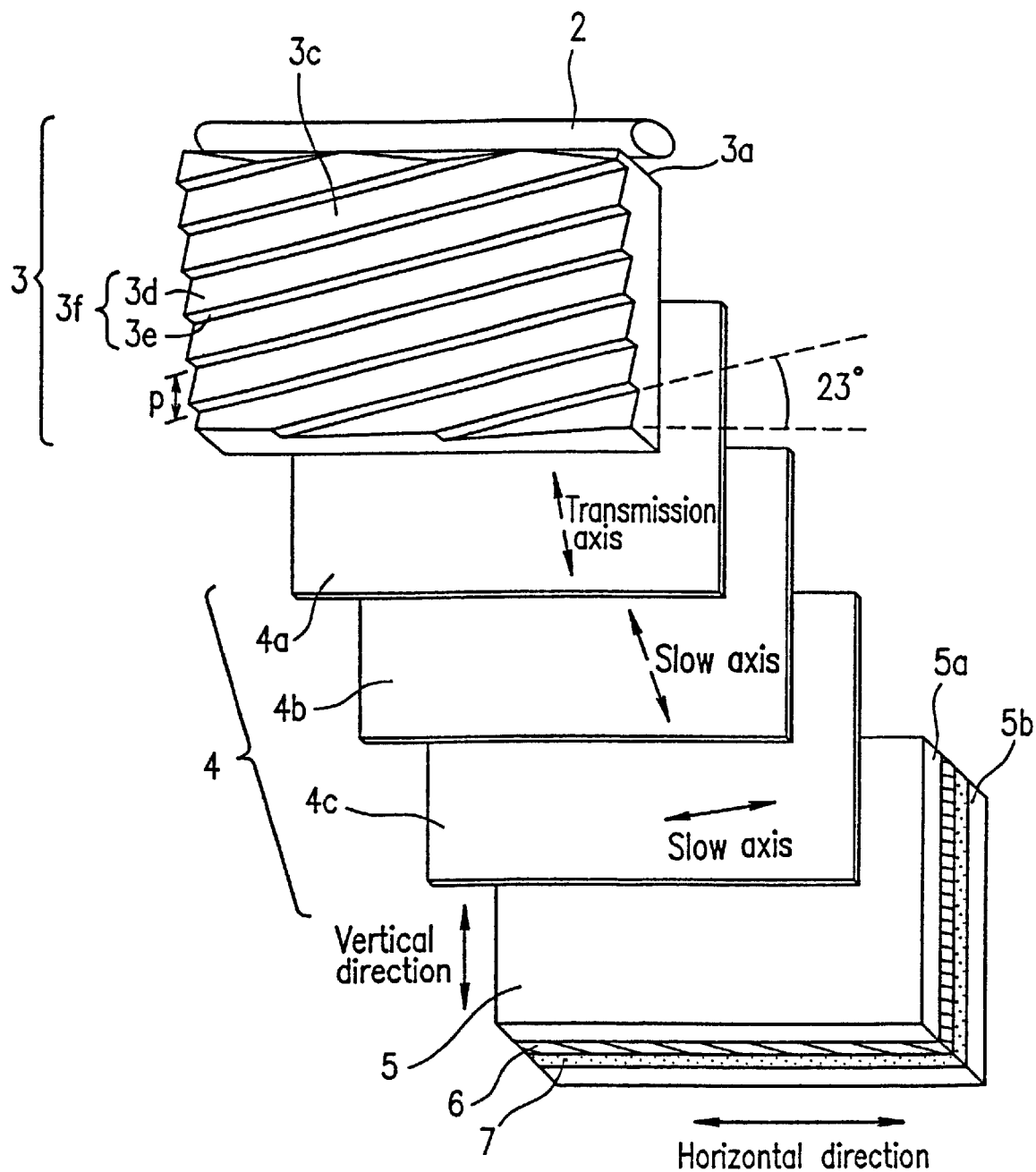
FIG. 2 is a perspective view showing a structure of the reflective type liquid crystal display apparatus according to Embodiment 1.

FIGS. 1 and 2 show a structure of a reflective type liquid crystal display apparatus according to Embodiment 1.

The reflective type liquid crystal display apparatus of Embodiment 1 includes a front light 1 and a reflective type liquid crystal display device 5. The front light 1 includes a light source 2, a light guide 3, and a polarization selecting section 4. The reflective type liquid crystal display device 5 includes a pair of glass substrates 5*a* and 5*b* including a liquid crystal layer 6 interposed therebetween; and the reflective type liquid crystal display device 5 includes a reflector 7 on the backside of the liquid crystal layer 6.

The light guide 3 is made from polymethylmethacrylate by injection molding, and a refractive index thereof is about 1.49. The light guide 3 has a light introduction surface 3*a* and a lower surface 3*b* which is substantially perpendicular to the light introduction surface 3*a*. An upper surface 3*c* opposite to the lower surface 3*b* includes periodic concave and convex portions 3*f* formed at a predetermined pitch in the shape of a prism, and each of the periodic concave and convex portions 3f includes a propagation portion 3d and a reflection portion 3e. The periodic concave/convex portions 3f are designed so that the display quality does not deteriorate due to the second interference fringe caused by the interference with a pixel pattern of the reflective type liquid crystal display device 5. In Example 1, a pitch p at which the periodic concave/convex portions 3f are formed is about 390 µm, and a stripe of each periodic concave/convex portion makes an angle of about 23° with a horizontal direction of the pixel pattern of the reflective type liquid crystal display device 5. The shape of the periodic concave/convex portions 3f is designed such that light from the light source 2 can be effectively output. In Example 1, within the pitch p of about 390 µm, the average length of the propagation portion 3d is about 370 µm, and the average length of each reflection portion 3e is about 20 µm. The height of the prism comprising the propagation portion 3d and the reflection portion 3e is about 15 µm. The length of a reflection portion 3e closer to the light introduction surface 3a is greater than that of another reflection portion 3e away from the light introduction surface 3a, so that a uniform output of light can be obtained from the lower surface 3b.

The polarization selecting section 4 includes a polarizing plate 4a, a half-wave plate 4b and a quarter-wave plate 4c (FIG. 2). The refractive index of the polarization selecting section 4 is about 1.5. The polarizing plate 4a, the half-wave plate 4b and the quarter-wave plate 4c are integrated together in this order via adhesive layers interposed therebetween (not shown). The polarizing plate 4a of the polarization selecting section 4 and the lower surface 3b of the light guide 3 are optically attached together via an adhesive layer 10 so that no reflection occurs at the interface between the polarizing plate 4a and the lower surface 3b. The transmission axis of the polarizing plate 4a, the slow axis of the half-wave plate 4b, and the slow axis of the quarter-wave plate 4c are arranged, as shown in FIG. 2, according to the type of liquid crystal material or the type of orientation mode used in the reflective type liquid crystal display device 5, or the desired viewing angle characteristic. A portion of light introduced to the polarization selecting section 4 and transmitted through the polarizing plate 4a is optically rotated by the half-wave plate 4b to be linearly polarized light which makes an angle of about 45° with the slow axis of the quarter-wave plate 4c. Accordingly, the light finally output from the front light 1 is circularly polarized light. According to this configuration, the tolerance of the phase delay with respect to the wavelength of light from the quarter-wave plate 4c can be compensated for by the half-wave plate 4b, whereby circularly polarized light can be output over the wide wavelength range. In Embodiment 1, an adhesive containing acrylic oligomer having a refractive index of about 1.5 is used as an adhesive layer 10.

The light source 2 may be a fluorescent light. The light source 2 is located in the vicinity of the light introduction surface 3a of the light guide 3. Light incident on the light guide 3 propagates through the front light 2 while passing through the polarization selecting section 4 repeatedly. Then, the light which has reached the reflection portion 3e is reflected toward the lower surface 3b. The reflected light is transmitted through the polarization selecting section 4 and output as the illumination light in the form of circularly polarized light.

In the reflective type liquid crystal display device 5, illumination light incident thereon is reflected by a reflector 7, and then the reflected light is modulated by the liquid crystal layer 6 such that the amount of light which again enters the polarization selecting section 4 is regulated, thereby displaying images. In Embodiment 1, as the reflective type liquid crystal display device 5, a 3.8" QVGA (960×240 pixels arranged in a stripe arrangement, pixel size: 81 µm×234.5 µm) display is employed.

Figure 3:
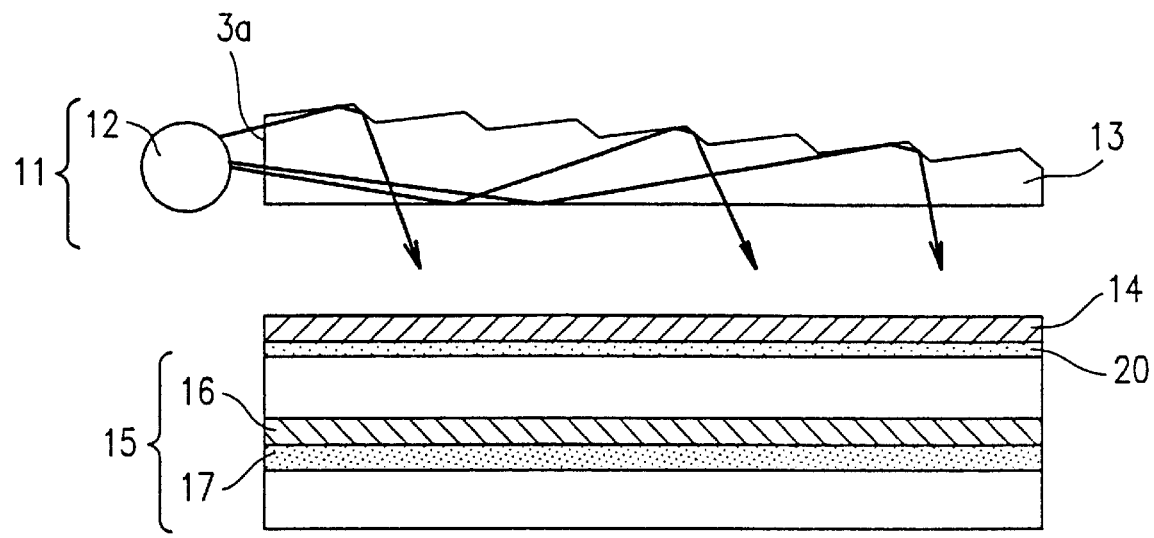
FIG. 3 is a cross-sectional view showing a structure of a conventional reflective type liquid crystal display apparatus.

Next, the display quality of the reflective type liquid crystal display apparatus of Embodiment 1 will be described. Herein, the reflective type liquid crystal display apparatus of Embodiment 1 is compared with a conventional reflective type liquid crystal display apparatus having a front light 11 including a light source 12 and a light guide 13 as shown in FIG. 3, and a reflective type liquid crystal display device 15 to which a polarization selecting section 14 is attached via an adhesive layer 20. The light source 12, the light guide 13, the polarization selecting section 14, the reflective type liquid crystal display device 15, and the adhesive layer 20 are the same as those used in Embodiment 1.

Figure 5A:
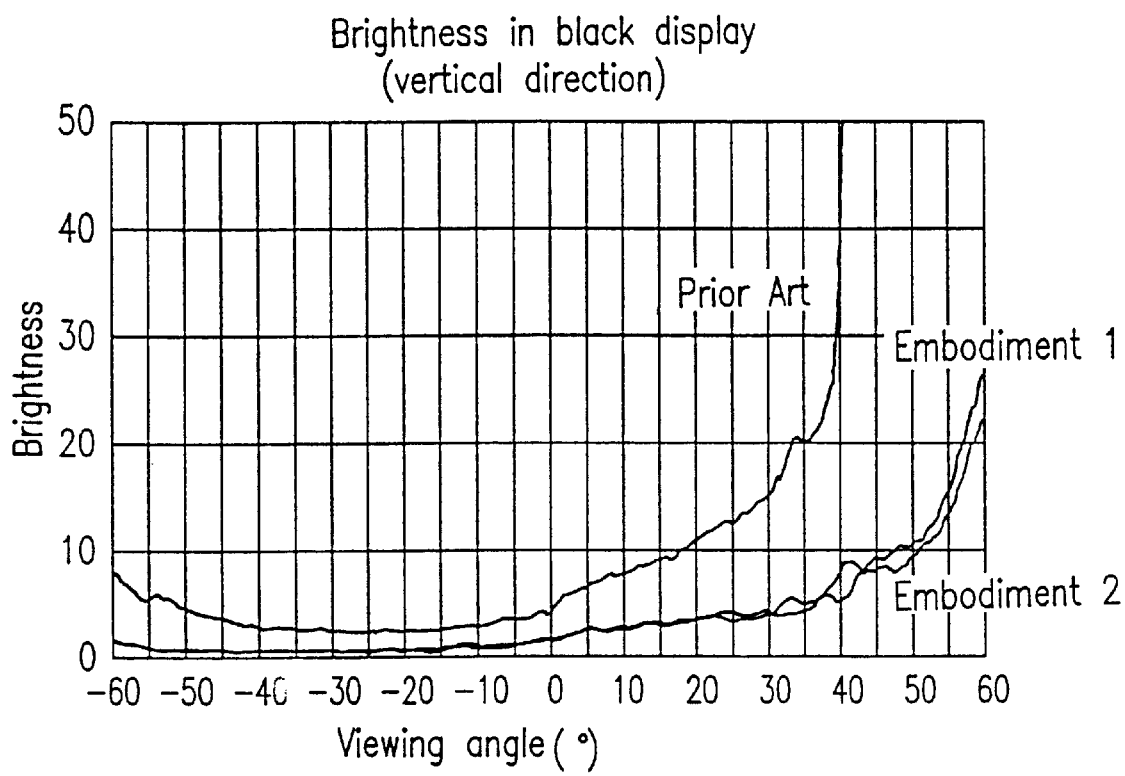
FIG. 5A is a graph showing a measurement result of brightness of the black display in the vertical direction for the reflective type liquid crystal display apparatuses according to Embodiment 1, Embodiment 2, and the prior art.
Figure 5B:
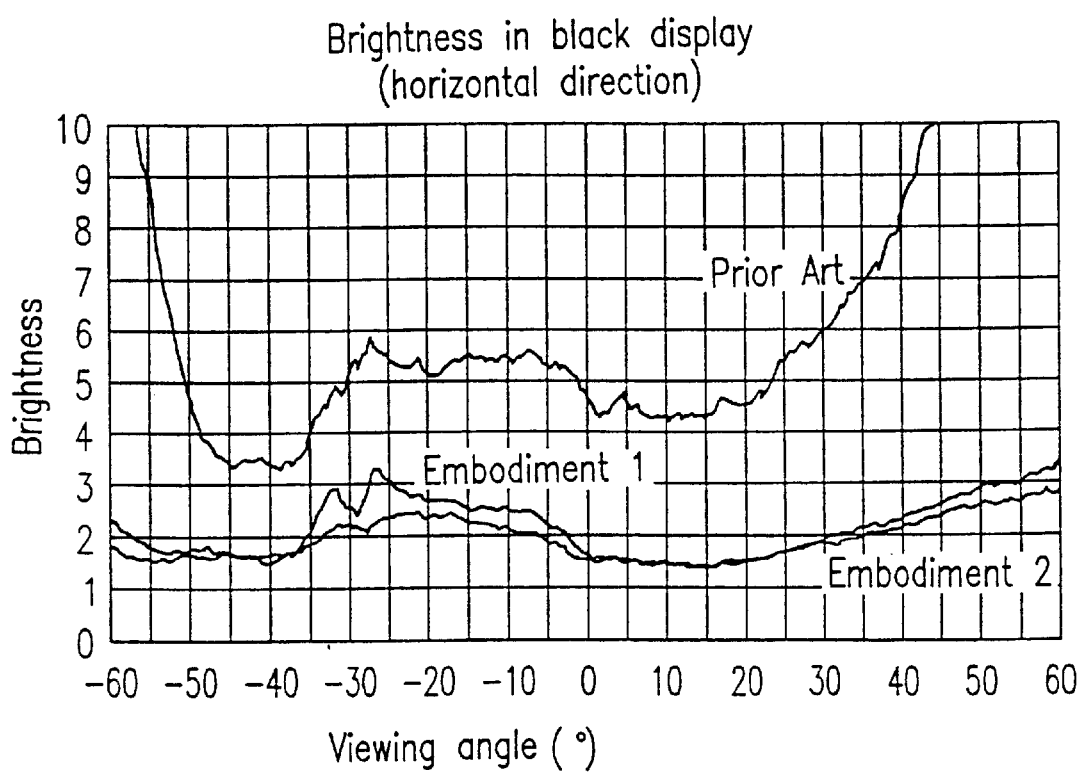
FIG. 5B is a graph showing a measurement result of brightness of the black display in the horizontal direction for the reflective type liquid crystal display apparatuses according to Embodiment 1, Embodiment 2, and the prior art.
Figure 6A:
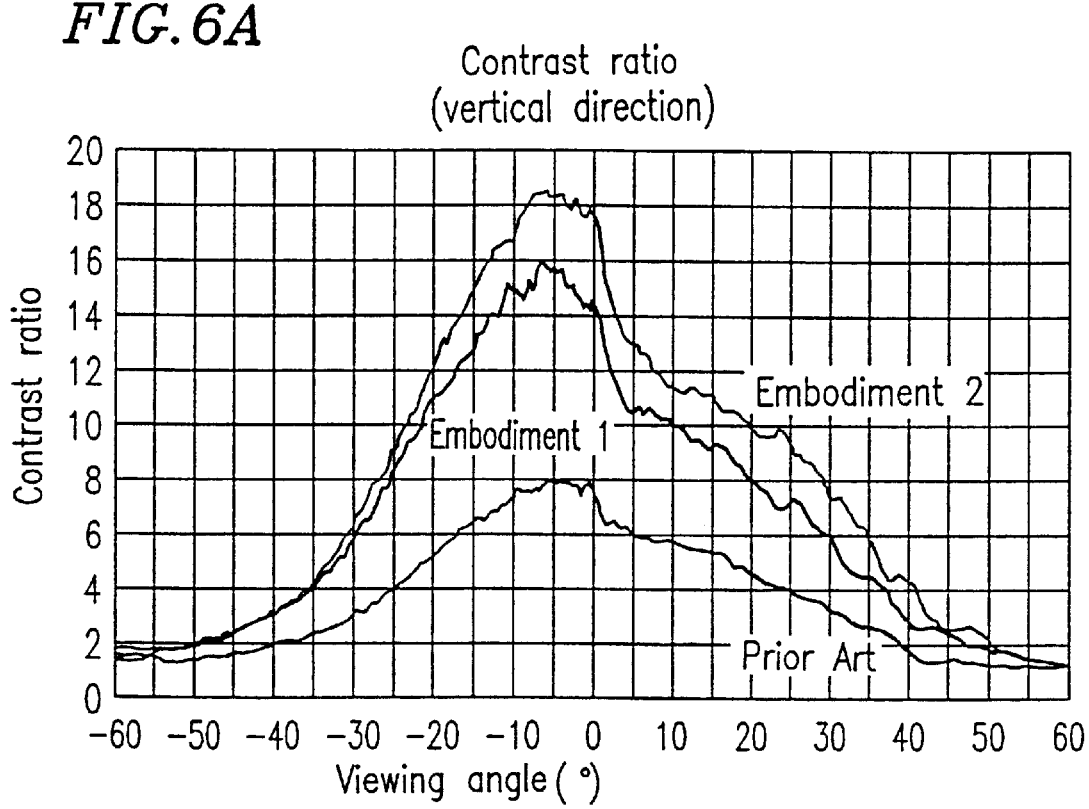
FIG. 6A is a graph showing the contrast ratio in the vertical direction for the reflective type liquid crystal display apparatuses according to Embodiment 1, Embodiment 2, and the prior art.
Figure 6B:
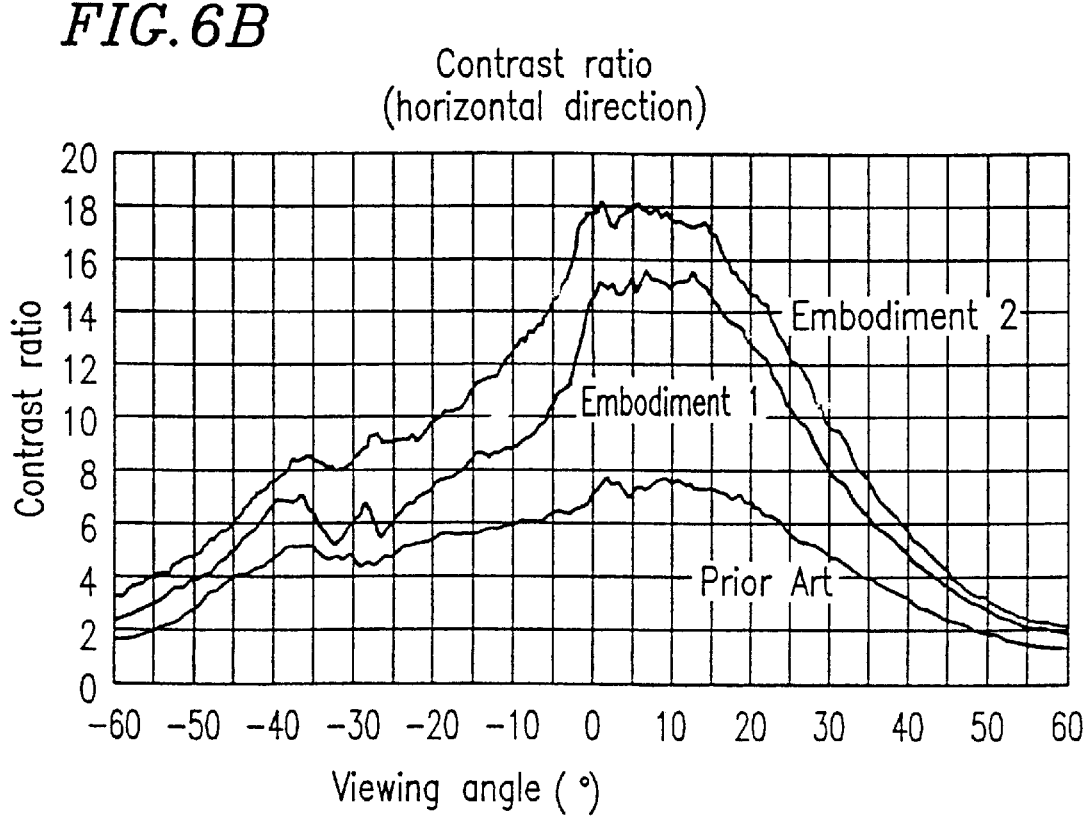
FIG. 6B is a graph showing the contrast ratio in the horizontal direction for the reflective type liquid crystal display apparatuses according to Embodiment 1, Embodiment 2, and the prior art.

For the reflective type liquid crystal display apparatus according to Embodiment 1 and the conventional reflective type liquid crystal display apparatus, the brightness of the display when irradiated with a front light is measured. Measurement results for the brightness in a white display and the brightness in a black display are shown in FIGS. 4A–4B and FIGS. 5A–5B, respectively. In addition, the ratio of the black display to the white display (i.e., the contrast ratio) is shown in FIGS. 6A and 6B. The measurement is conducted using EZContrast manufactured by ELDIM with respect to the vertical direction and the horizontal direction of the reflective type liquid crystal display apparatus for various viewing angles ranging from −60° to +60°.

Figure 4A:
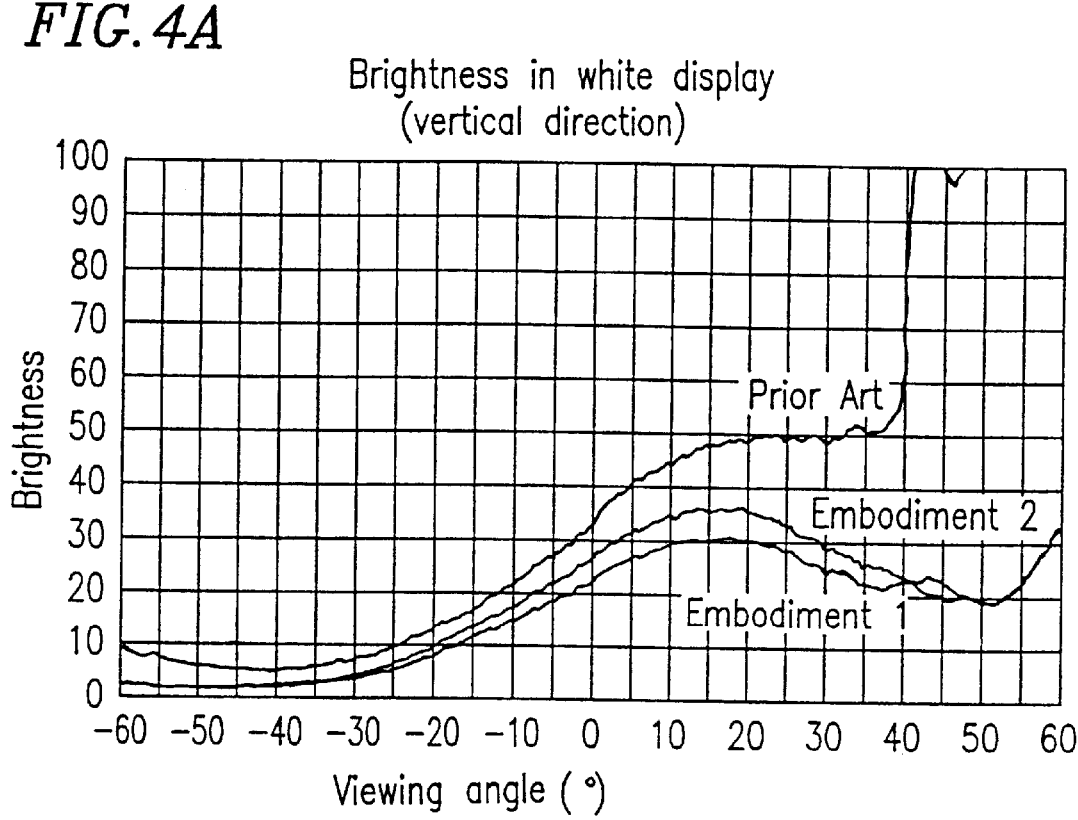
FIG. 4A is a graph showing a measurement result of brightness of the white display in the vertical direction for the reflective type liquid crystal display apparatuses according to Embodiment 1, Embodiment 2, and the prior art.
Figure 4B:
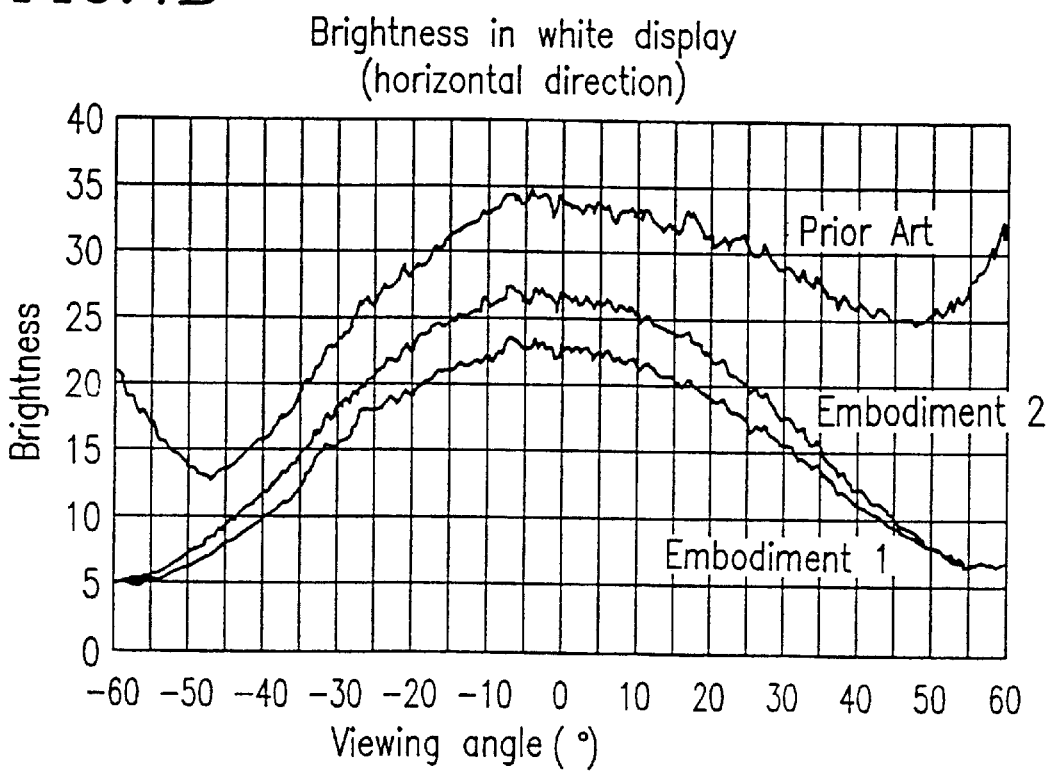
FIG. 4B is a graph showing a measurement result of brightness of the white display in the horizontal direction for the reflective type liquid crystal display apparatuses according to Embodiment 1, Embodiment 2, and the prior art.

In the reflective type liquid crystal display apparatus of Embodiment 1, as shown in FIGS. 4A and 4B, the brightness in a white display is about ⅔ of that of the conventional reflective type liquid crystal display apparatus. However, as shown in FIGS. 5A–5B, the brightness of the black display is less than about ½ of that of the conventional reflective type liquid crystal display apparatus. Especially when the viewing angle is large, the amount of light significantly decreases. Therefore, as shown in FIGS. 6A and 6B, the contrast ratio of the reflective type liquid crystal display apparatus of Embodiment 1 becomes twice as large as that of the conventional reflective type liquid crystal display apparatus, whereby the display quality significantly improves while the angle from which the display can be comfortably observed, i.e., the viewing angle becomes larger.

As described above, in the reflective type liquid crystal display apparatus of Embodiment 1, the brightness in a black display, i.e., the amount of leak light directly output from an upper surface of the front light to the viewer is less than about ½ of that of the conventional reflective type liquid crystal display apparatus. Thus, adverse effects of a foreign material such as dust and other attached substance, or a flaw, existing in the vicinity of the upper surface of the front light which may reflect and scatter light create a bright spot.

Furthermore, light output from the front light of Embodiment 1 is circularly polarized light because it has already been transmitted through the polarization selecting section. On the other hand, in the conventional front light, light output from the front light is polarized by the polarization selecting section which is attached to the reflective type liquid crystal display device so as to be circularly polarized light. Therefore, even when the amount of light incident on the reflective type liquid crystal display device is the same in the present invention as in the conventional device, the amount of illumination light output from the front light of the present invention is reduced to about ½ that of the conventional device. Thus, adverse effects of a foreign material such as dust and other attached substance, or a flaw, existing in the vicinity of the upper surface of the front light which may reflect and scatter light create a bright spot. Thus, the display quality as well as the production yield can be improved.

Furthermore, in Embodiment 1, light reflected by the surface facing the reflective type liquid crystal display device of the front light (i.e., the interface between the quarter-wave plate and air), and light reflected by the surface of the reflective type liquid crystal display device are converted to linearly polarized light which makes an angle of 90° with the transmission axis of the polarizing plate while passing through the quarter-wave plate again, and absorbed by the polarizing plate. Accordingly, generation of a brightness fringe of the light guide due to the surface reflection and deterioration of the contrast ratio can be prevented. Likewise, when the display is observed with ambient light around the reflective type liquid crystal display apparatus, deterioration of the contrast ratio can be suppressed.

As described above, by using the front light in which the polarization selecting section is attached to the light guide via the adhesive layer, a reflective type liquid crystal display apparatus having a high contrast ratio, a superior display quality with reduced adverse effects of foreign materials, and a high production yield, can be obtained.

In Embodiment 1, the periodic concave/convex portions of the light guide are formed in a prism shape, but may be formed in other shapes such as a trapezoid, a lenticular shape, a dome shape and the like. As the material of the light guide, a transparent resin such as a polycarbonate resin, an epoxy resin, etc., a glass, or the like can be appropriately used as well as an acrylic resin such as polymethylmethacrylate.

As the light source, an EL device, an LED, a combination of an LED and a stick-shaped light guide, or the like, as well as a fluorescent light, can be used as long as it can uniformly irradiate the light introduction surface of the light guide.

A technique for optically attaching the polarization selecting section to the lower surface of the light guide is not limited to an adhesive layer. Any technique such as an adhesive agent, a curable resin or the like can be employed as long as it can be attached to the light guide such that no reflection occurs at the interface therebetween.

An angle between the direction of the stripe of the periodic concave/convex portions $3f$ and the horizontal direction of the pixel pattern of the reflective type liquid crystal display device 5 is not limited to the above-mentioned angle. However, it is preferable to set the angle to be in a range between about 10° and about 80° in order to prevent the second brightness fringe from being observed.

Figure 7:
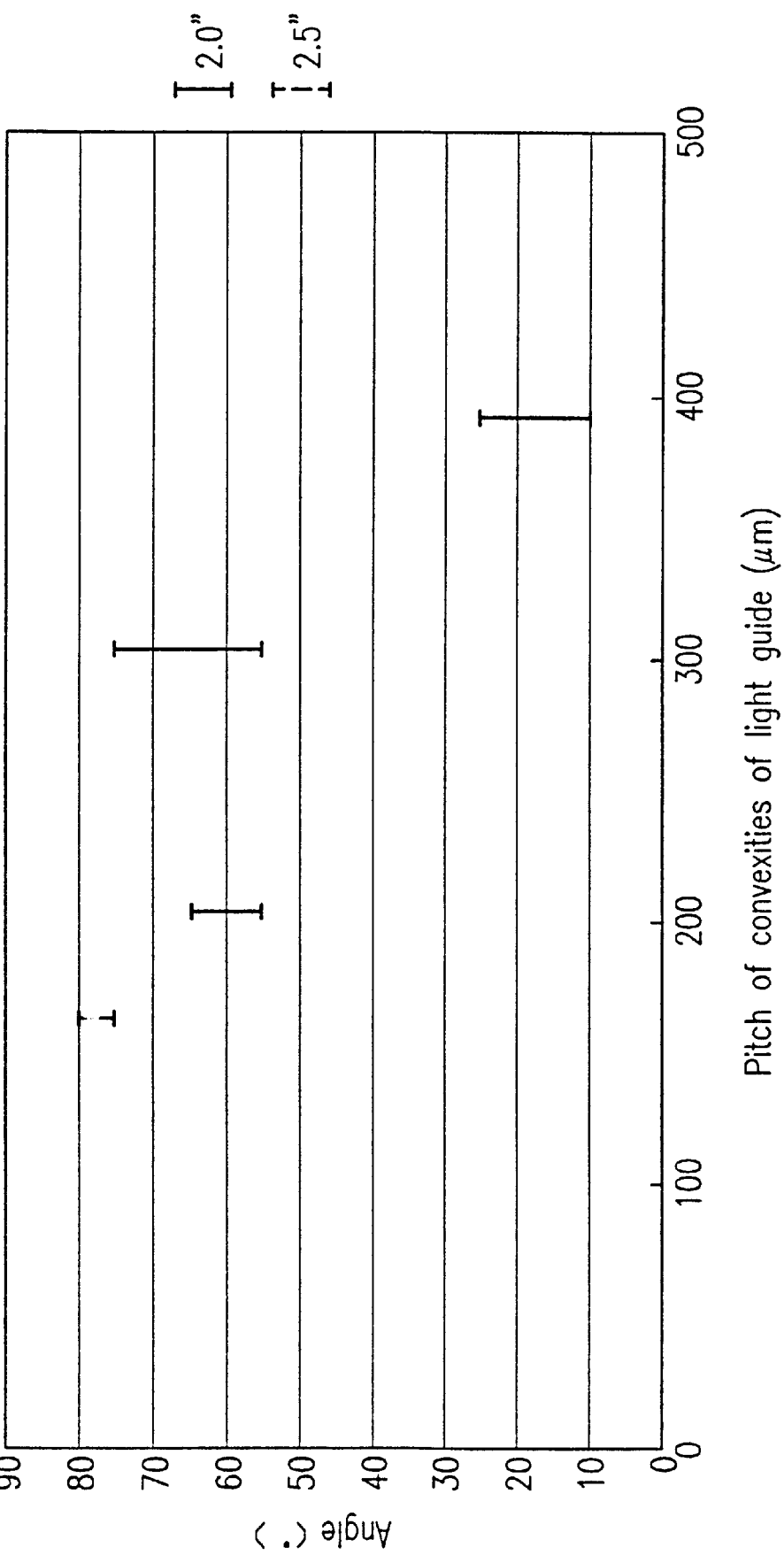
FIG. 7 is a graph showing a range of an angle between a direction of a stripe of periodic concave/convex portions of the light guide and the horizontal direction of a repetitive pixel pattern when the pixel pattern is a delta arrangement, in which the second brightness fringe is not observed.

FIG. 7 shows a measurement result for an angle range in which any second brightness fringe is not perceived in a delta arrangement. The front light is provided in front of the 2.0″ and 2.5″ reflective type liquid crystal display device of the delta arrangement, and the second brightness is observed while changing the angle between the direction of the stripe of the periodic concave/convex portions of the light guide and the horizontal direction of the repetitive pixel pattern of the reflective type liquid crystal display device. Solid lines correspond to the 2.0″ device, and a broken line corresponds to the 2.5″ device.

As seen from FIG. 7, in these devices the second brightness fringe is not generally observed at angles in the range between about 10° and about 25°, or between about 55° and about 80°, though these ranges may vary depending upon the pitch at which the periodic concave/convex portions are formed.

Figure 8:
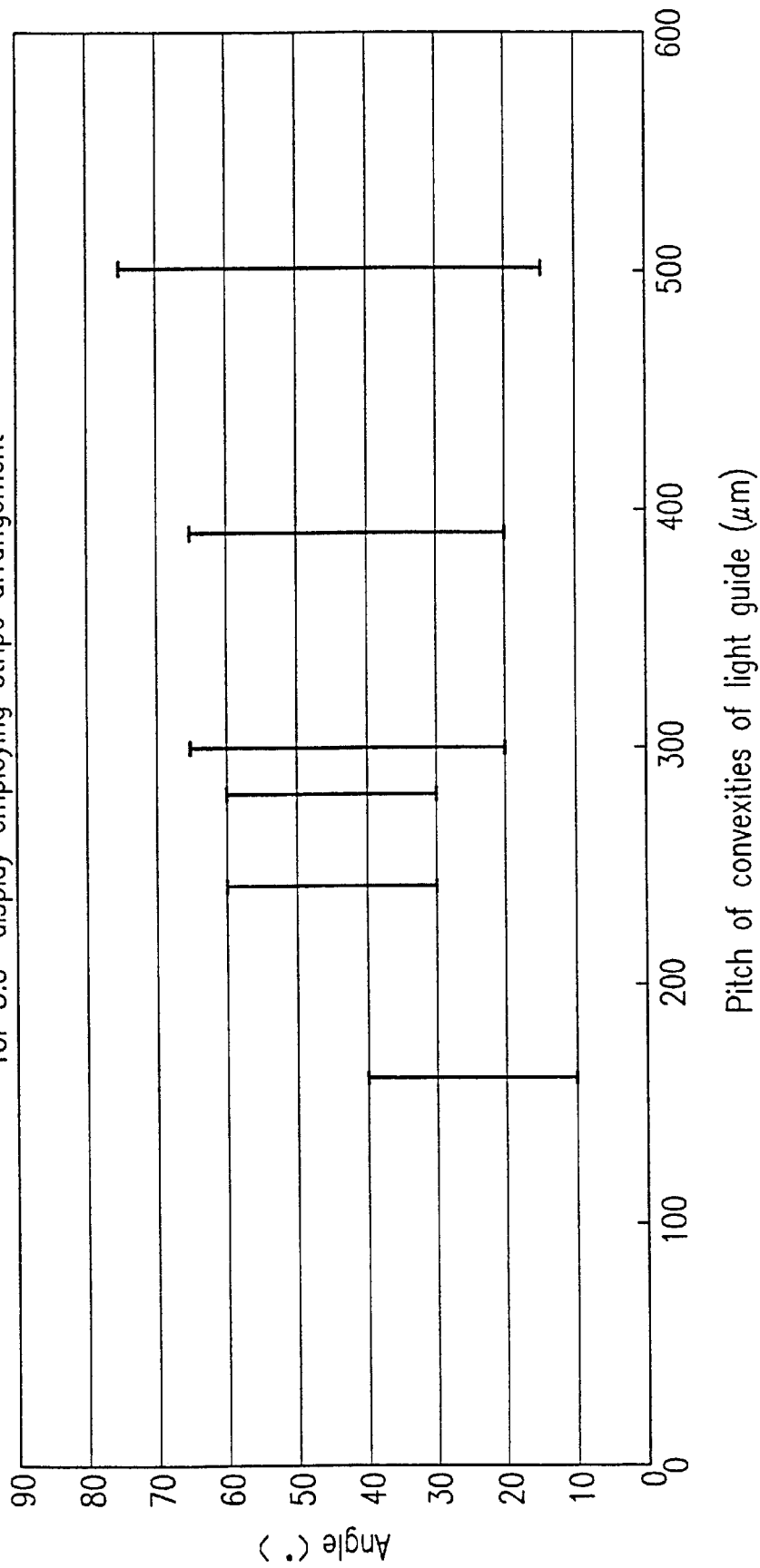
FIG. 8 is a graph showing a range of an angle between a direction of a stripe of periodic concave/convex portions of the light guide and the horizontal direction of a repetitive pixel pattern when the pixel pattern is a stripe arrangement, in which the second brightness fringe is not observed.

FIG. 8 shows a measurement result for an angle range in which any second brightness fringe is not perceived in a stripe arrangement. The front light is provided in front of the 3.8″ QVGA reflective type liquid crystal display device of the stripe arrangement, and the second brightness is observed while changing the angle between the direction of the stripe of the periodic concave/convex portions of the light guide and the horizontal direction of the repetitive pixel pattern of the reflective type liquid crystal display device.

As seen from FIG. 8, in this device, the second brightness fringe is not generally observed at angles in the range between about 15° and about 75°, though these ranges may vary depending upon the pitch at which the periodic concave/convex portions are formed.

Thus, when the light guide is designed such that the angle between the direction of the stripe of the periodic concave/convex portions and the horizontal direction of the pixel pattern of the reflective type liquid crystal display device is in the above-described ranges, the second brightness fringe is prevented from being observed, whereby a reflective type liquid crystal display apparatus having a superior display quality can be realized.

(Embodiment 2)

Figure 9:
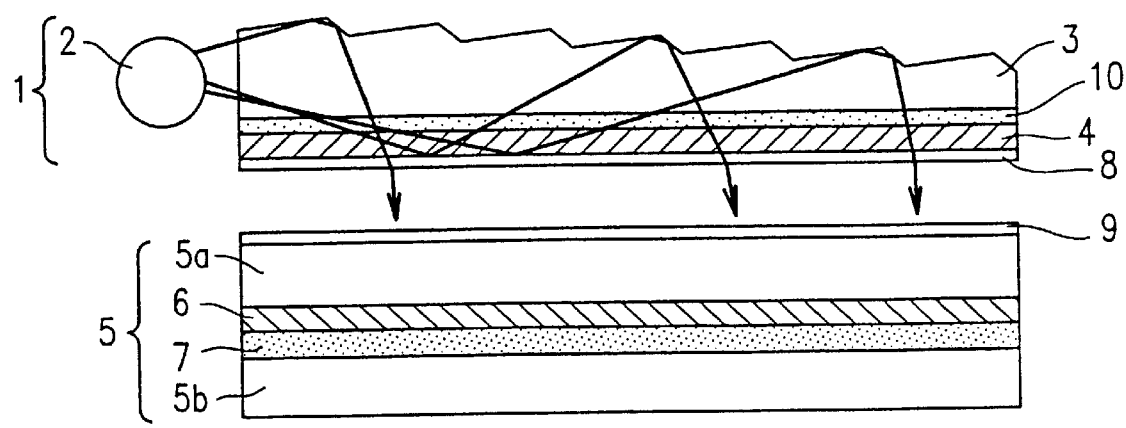
FIG. 9 is a cross-sectional view showing a structure of a reflective type liquid crystal display apparatus according to Embodiment 2.

FIG. 9 shows a structure of the reflective type liquid crystal display apparatus according to Embodiment 2.

In this reflective type liquid crystal display apparatus, a front light 1 and a reflective type liquid crystal display device 5 are the same as those used in Embodiment 1. However, the polarization selecting section 4 of the front light 1 and the glass substrates 5$a$ of the reflective type liquid crystal display device 5 are provided with anti-reflection means 8 and 9 on the surfaces thereof, respectively. As the anti-reflection means 8 and 9, an anti-reflection film manufactured by Nitto Denko Corporation (product name: TAC-HC/AR) is employed. The anti-reflection film is attached to the surface via an the adhesive layer (not shown).

FIGS. 4A and 4B, 5A and 5B, and 6A and 6B also illustrate the brightness in a white display, the brightness in a black display, and the contrast ratio, respectively, when the front light illuminates the reflective type liquid crystal display device 5 in the reflective type liquid crystal display apparatus of Embodiment 2.

As shown in FIGS. 4A and 4B, the reflective type liquid crystal display apparatus of Embodiment 2 exhibits about 15–20% improvement in the brightness of a white display with respect to the reflective type liquid crystal display apparatus of Embodiment 1. As shown in FIGS. 5A and 5B, the brightness of a black display of the reflective type liquid crystal display apparatus of Embodiment 2 is equal to that of the device of Embodiment 1. Thus, as shown in FIGS. 6A and 6B, the reflective type liquid crystal display apparatus of Embodiment 2 exhibits 15–20% improvement in the contrast ratio with respect to the reflective type liquid crystal display apparatus of Embodiment 1.

Furthermore, in the reflective type liquid crystal display apparatus of Embodiment 2, surface reflections by the polarization selecting section 4 and the reflective type liquid crystal display device 5 are reduced by the anti-reflection film. Therefore, both when the reflective type liquid crystal display device 5 is illuminated by the front light 1 and when the reflective type liquid crystal display device 5 is illuminated by an ambient light, the amount of light incident on and/or output from the reflective type liquid crystal display device 5 increases, whereby a brighter display can be achieved.

As described above, by providing the anti-reflection means on the surfaces of the polarization selecting section and the reflective type liquid crystal display device, which face each other, the reflective type liquid crystal display apparatus with high brightness, high contrast ratio, further reduced adverse effects of foreign materials, a superior display quality, and high production yield can be obtained.

In embodiment 2, the anti-reflection means may be a commercially available anti-reflection film. Alternatively, as an anti-reflection treatment, an anti-reflection film such as $MgF_2$ or $SiO_2$ having a thickness of about 0.1 μm made by vapor deposition or sputtering, which reduces reflection energy by the interferential action of the thin film, may be attached to the surfaces of the polarization selecting section and the reflective type liquid crystal display device. In this case, it is preferable that a film used as a base material has low birefractibity. Alternatively, the anti-reflection film may be directly formed on the surfaces of the polarization selecting section and the reflective type liquid crystal display device.

(Embodiment 3)

Figure 10:
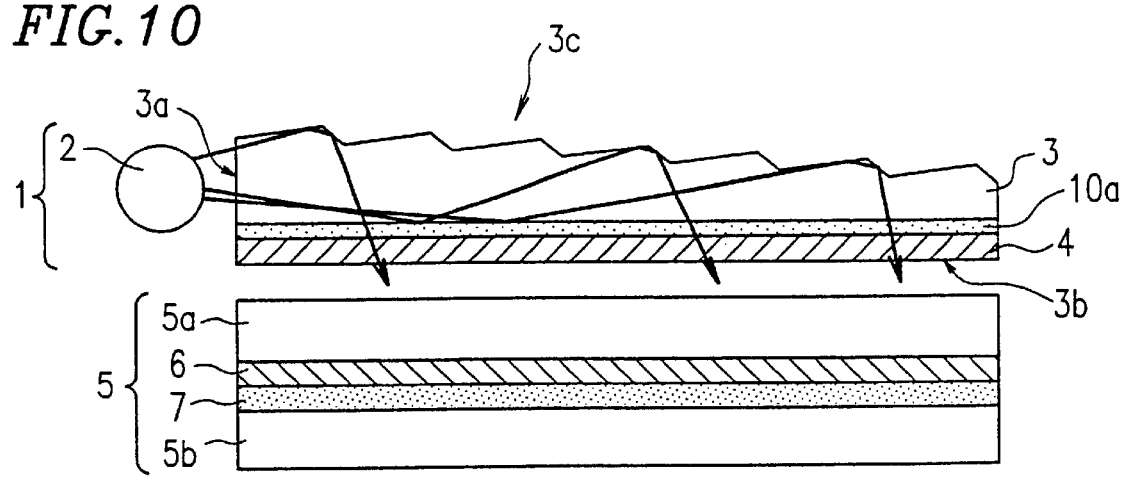
FIG. 10 is a cross-sectional view showing a structure of a reflective type liquid crystal display apparatus according to Embodiment 3.

FIG. 10 shows a structure of a reflective type liquid crystal display apparatus according to Embodiment 3.

In the front light 1 of Embodiment 3, the light guide 3 and the polarization selecting section 4, which are the same as those used in Embodiment 1, are combined via a low-refractive resin layer 10a. The front light 1 of Embodiment 3 is placed above the reflective type liquid crystal display device 5, which is the same as that used in Embodiment 1.

As the low-refractive resin layer 10a, DEFENNSA 7702A manufactured by Dainippon Ink and Chemicals, Inc. is employed. This resin is of a UV curable type, and the refraction index thereof when it is cured is about 1.38, which is smaller than the refractive index of the light guide 3 made from polymethylmethacrylate, i.e., about 1.49.

Figure 11:
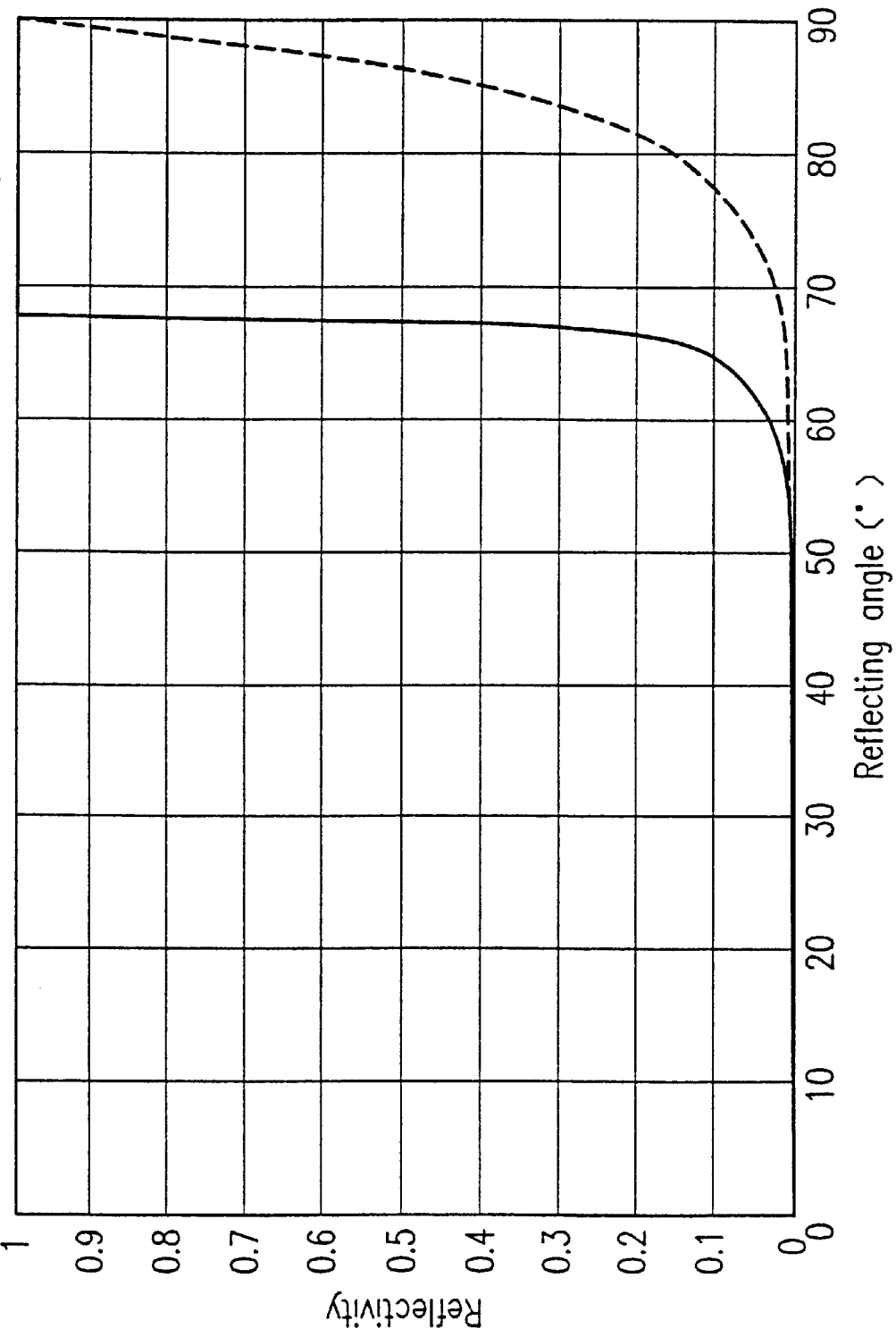
FIG. 11 is a graph showing a relationship between a reflectivity and a viewing angle at an interface between the light guide and the refraction layer when a refraction layer having a refractive index different from that of the light guide.

In FIG. 11, a solid line illustrates the relationship between the refractive index and the reflecting angle at the interface between the light guide 3 and the low-refractive resin layer 10a. A broken line illustrates, for comparison, the relationship between the refractive index and the reflecting angle at the interface between the light guide 3 and the low-refractive resin layer 10a where the light guide 3 is made from polymethylmethacrylate having a refractive index of about 1.49, which is identical with that used above, and the refractive index of the refraction layer is about 1.6.

As seen from FIG. 11, by providing the refraction layer having a refractive index different from that of the light guide, light having a large reflecting angle is reflected by the interface therebetween, whereby the amount of light propagating through the light guide increases. Especially in the case where the refractive index of the refraction layer is smaller than that of the light guide, a total reflection (where the refractive index is 1) occurs. Therefore, light can efficiently propagate through the light guide.

In Embodiment 3 where the total reflection angle is 68°, light from the light source 2 which has been incident on the end surface of the light guide 3 propagates through the light guide 3 while being reflected by the interface between the light guide 3 and the low-refractive resin layer 10a and by the upper surface of the light guide 3, which is opposite to a surface contacting with the low-refractive resin layer 10a. Thus, uniform illumination is provided by the front light 1. Furthermore, because of the large reflecting angle, light is not reflected toward the viewer, whereby the adverse effects on the display quality of the reflective type liquid crystal display device can be prevented.

Figure 12:
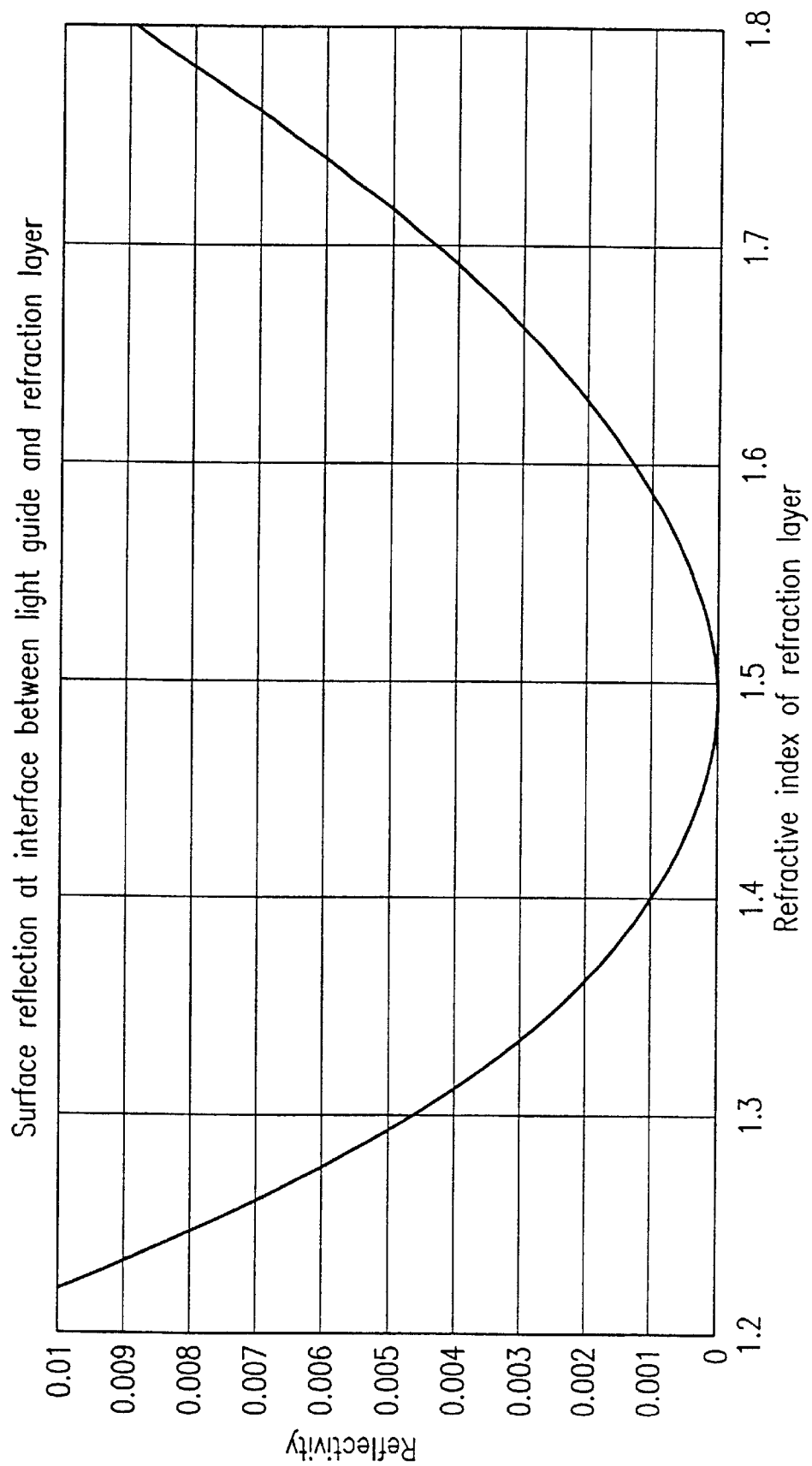
FIG. 12 is a graph showing a relationship between a surface reflectivity at the interface between the light guide and the refraction layer and a refractive index of the refraction layer.

FIG. 12 illustrates the reflectivity with respect to the reflecting angle of 0° at the interface between the light guide and the refraction layer, i.e., the relationship between the surface reflectivity and the refractive index of the refraction layer.

As seen from FIG. 12, the surface reflection increases as a difference in the refractive index between the light guide and the refraction layer becomes larger. However, when the difference is about 0.2 or less, the reflectivity at the interface therebetween is about 0.5% or less. Thus, the reflectivity at the interface between the light guide and the polarization selecting section can be suppressed at about 1% or less. Considering that the refractive index of a glass plate or a acrylic plate which has been subjected to a common anti-reflection treatment is about 1%, the surface reflection on the refraction layer is not large enough to greatly deteriorate the display quality of images produced by the reflective type liquid crystal display device when it is illuminated by the ambient light.

In Embodiment 3 where the refractive index of the refraction layer (low-refractive index resin layer 10a) is about 1.38 and the surface reflection is about 0.1%, the display quality of the images produced by the reflective type liquid crystal display device can be maintained in an appropriate condition.

On the other hand, in the front light 1 of Embodiment 1, the polarization selecting section 4 is attached to the light guide 3 via the adhesive layer 10 having a refractive index of about 1.5, so that the reflection does not substantially occur on the surface of the polarization selecting section 4. Therefore, light from the light source 2 which has been incident on the end surface 3a of the light guide 3 propagates through the light guide 3 while being reflected by the surface 3b of the polarization selecting section 4 facing the reflective type liquid crystal display device 5 and on the upper surface 3c of the light guide 3. However, a substantially entire portion of light which has been reflected by the polarization selecting section 4 is absorbed due to the effect of the modulation by the polarizing plate and the phase plate (a half-wave plate or a quarter-wave plate), whereby the amount of light propagating through the light guide 3 decreases. Thus, in the reflective type liquid crystal display apparatus, illumination light from the front light 1 becomes darker as an output position of the illumination light goes away from the light source 2, whereby the entire portion of the reflective type liquid crystal display device 5 cannot be uniformly illuminated with the light from the front light 1.

Next, Table 1 shows the measurement results of the average brightness and the brightness distribution in the reflective type liquid crystal display apparatuses of Embodiments 1 and 3.

TABLE 1

Average brightness and brightness distribution of reflective liquid crystal display device

|  | Embodiment 3 | Embodiment 1 |
| --- | --- | --- |
| Average Brightness (cd/m$^2$) | 24.5 | 20.8 |
| Brightness Distribution (MAX/MIN) | 1.3 | 2.0 |

Measurement is conducted at 9 cross-points on the display field divided into 16 (4×4) equal segments as shown in FIG.

Figure 13A:
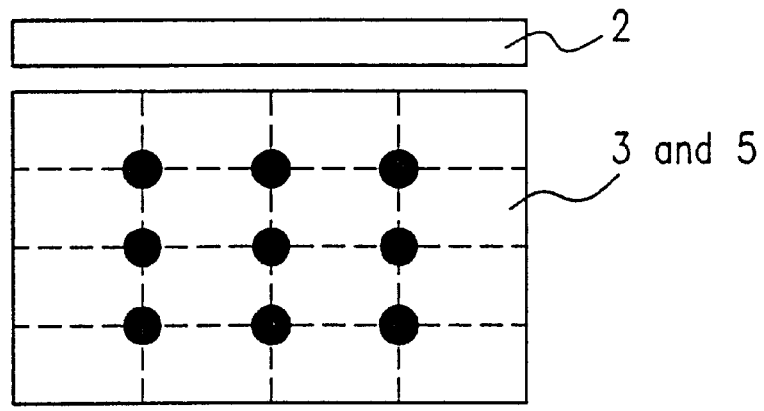
FIG. 13A is a plan view showing measuring points for the brightness in the reflective type liquid crystal display apparatus.
Figure 13B:
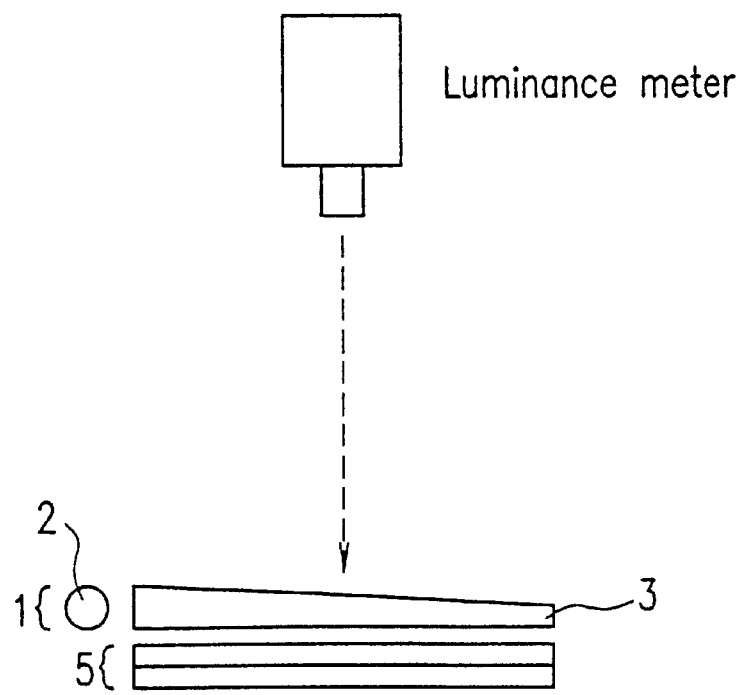
FIG. 13B is a cross-sectional view showing a system of measurement in the reflective type liquid crystal display apparatus.
Figure 14:
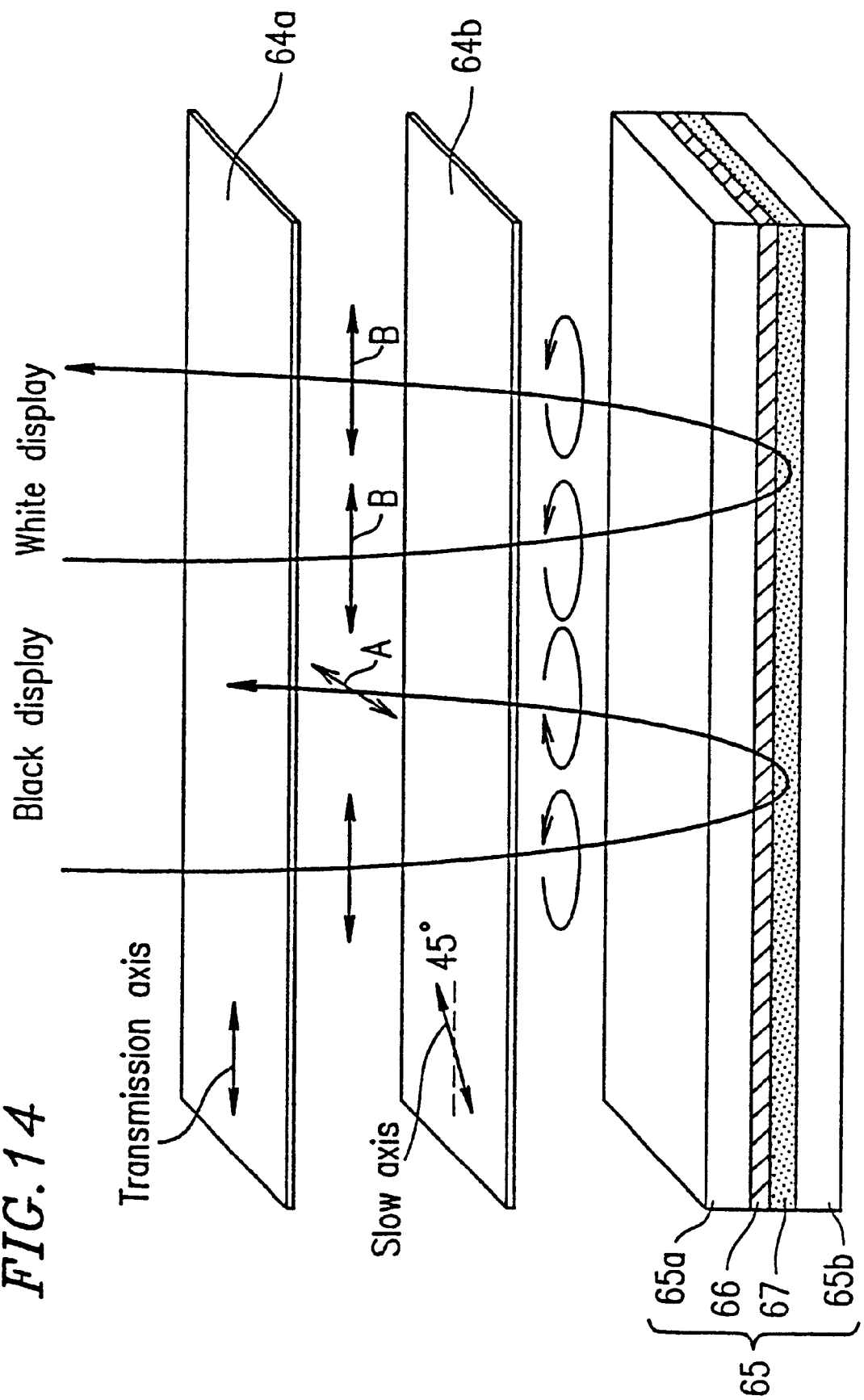
FIG. 14 is a perspective view illustrating a basic transition of the polarization of light in the reflective type liquid crystal display apparatus.
Figure 15A:
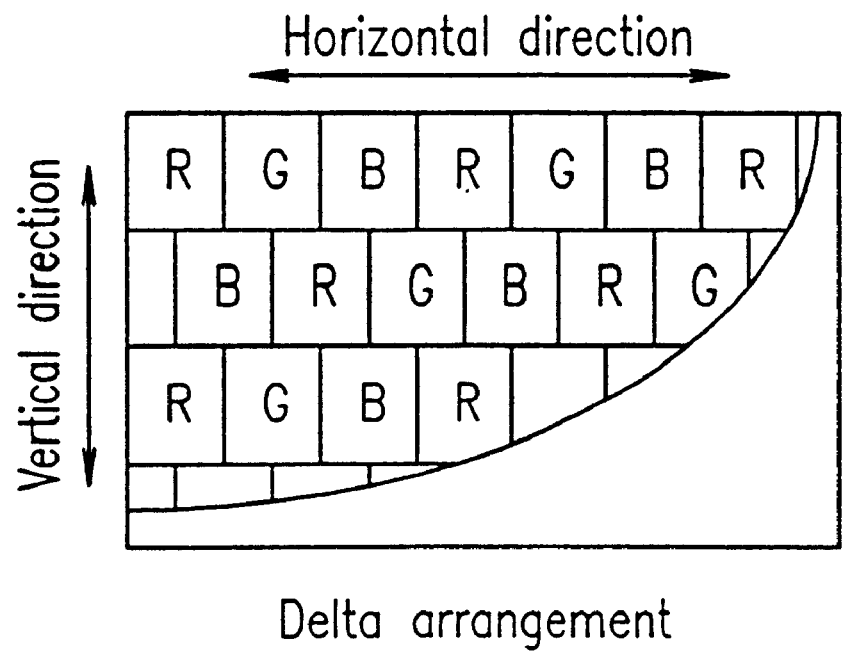
FIGS. 15A and 15B are plan views showing representative pixel arrays.
Figure 15B:
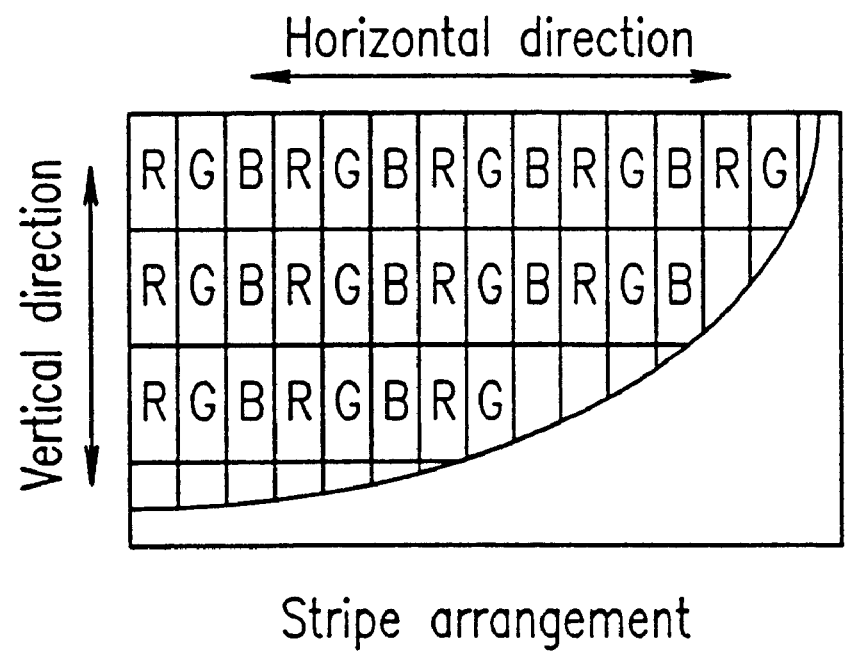
Figure 16:
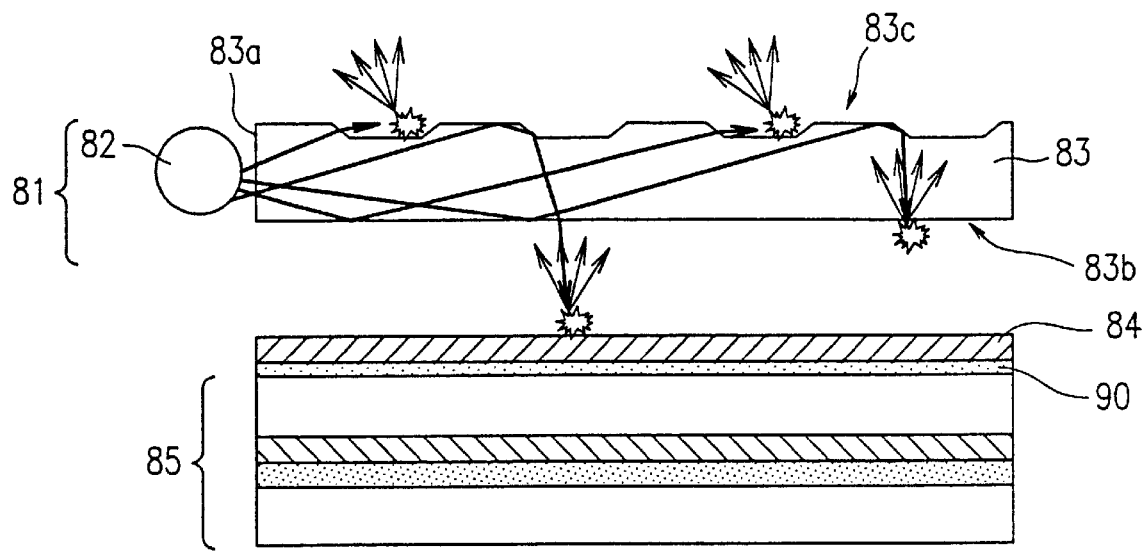
FIG. 16 is a cross-sectional view showing a structure of a conventional reflective type liquid crystal display apparatus.
Figure 17:
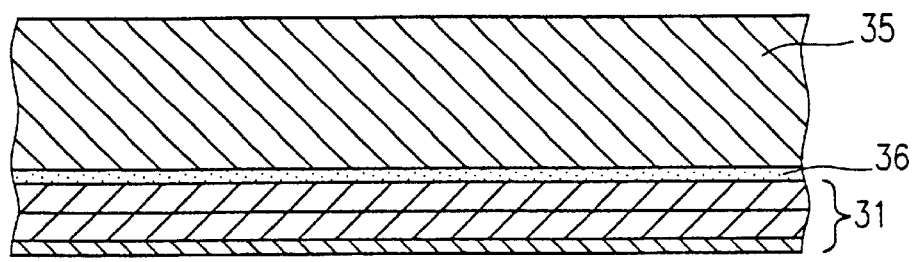
FIG. 17 is a cross-sectional view showing a structure of a conventional reflective type liquid crystal display apparatus.

13A. A measurement apparatus is a luminance meter, BM-5A manufactured by the TOPCOM Kabushiki Kaisha. This luminance meter is used in a measurement system shown in FIG. 13B for measuring the brightness of a white display in the reflective type liquid crystal display apparatus when the light source 2 of the front light 1 is turned ON in a dark place. Uniformity of the brightness can be represented as a brightness distribution which is obtained from a ratio of the measured maximum value to the measured minimum value (MAX/MIN) at the nine measuring points.

As seen from Table 1, in the reflective type liquid crystal display apparatus of Embodiment 3, the average brightness improves by about 15% or more with respect to the reflective type liquid crystal display apparatus of Embodiment 1. Furthermore, in Embodiment 3, uniformity of the brightness improves.

Thus, in Embodiment 3, by attaching the polarization selecting section to the light guide 3 via the resin layer 10*a* having a low refractive index, the amount of light propagating through the light guide increases. As a result, the front light providing bright and uniform illumination, and the reflective type liquid crystal display apparatus with a high contrast ratio and a reduced brightness variation can be obtained.

In Embodiment 3, the low-refraction layer is made of the UV curable resin. Instead, the polarization selecting section may be attached to the light guide via an adhesive layer made of an adhesive having a low refractive index.

The polarization selecting section can be attached to the light guide in various manners. For example, the polarization selecting section may be attached to the light guide through a transparent film having a low refractive index.

Furthermore, surfaces of the polarization selecting section and the reflective type liquid crystal display device, which face each other, may be subjected to an anti-reflection treatment, whereby the reflection by each of the interfaces between the polarization selecting section and the reflective type liquid crystal display device is reduced. Thus, brighter display can be realized.

As described hereinbefore, due to the front light of the present invention in which the polarization selecting section is optically attached to the light guide, the amount of light leaking through the upper surface of the light guide toward the viewer decreases. In addition, foreign materials present in the vicinity of the upper surface of the light guide can be prevented from being irradiated with the leak light or light output from the front light to be bright spots. These prevent the deterioration of the contrast ratio, thereby improving the production yield. Thus, a reflective type liquid crystal display apparatus with superior display quality can be obtained at a low cost.

Furthermore, a surface of the polarization selecting section facing the reflective type liquid crystal display device, a surface of the reflective type liquid crystal display device facing the polarization selecting section, or both of these surfaces, may be subjected to the anti-reflection treatment, thereby providing a brighter reflective type liquid crystal display apparatus with superior display quality as well as high production yield.

Furthermore, the polarization selecting section is attached to the light guide via the refraction layer having a refractive index different from that of the light guide, preferably, a refractive index lower than that of the light guide, thereby providing a reflective type liquid crystal display apparatus capable of displaying a brighter image with a small variation in the brightness.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflective type liquid crystal display apparatus, comprising:
   a front light including:
      a light source;
      a light guide for receiving light from the light source through an end surface of the light guide and outputting the light through a first large surface of the light guide which is substantially perpendicular to the end surface of the light guide; and
      a polarization selecting section for selectively transmitting light having particular polarization, the polarization selecting section being attached to the first large surface of the light guide;
   a reflective type liquid crystal display device including a plurality of pixels for receiving light from the first large surface of the light guide through the polarization selecting section, controlling polarization of the received light for each of the pixels, and reflecting the polarized light toward the polarization selecting section; and
   wherein a second large surface of the light guide opposite said first large surface of the light guide includes periodic concave/convex portions that are formed such that a direction of a stripe thereof is not identical with a horizontal direction of a reflective pixel pattern of the reflective type liquid crystal display device.

2. A reflective type liquid crystal display apparatus according to claim 1, wherein a surface of the polarization selecting section facing the reflective type liquid crystal display device is subjected to an anti-reflection treatment.

3. A reflective type liquid crystal display apparatus according to claim 1, wherein a surface of the reflective type liquid crystal display device facing the polarization selecting section is subjected to an anti-reflection treatment.

4. A reflective type liquid crystal display apparatus according to claim 1, wherein the reflective type liquid crystal display device and the polarization selecting section are not in contact with each other.

* * * * *